United States Patent [19]

Yuda et al.

[11] Patent Number: 4,609,560
[45] Date of Patent: Sep. 2, 1986

[54] NOVEL EMULSIFIER COMPOSITION AND QUALITY IMPROVEMENT METHOD FOR STARCH-CONTAINING FOODS

[75] Inventors: Mitsuharu Yuda; Hiroshi Sakka; Kenichi Yamada; Yoshihito Koizumi, all of Hirakata; Takeshi Yamaguchi, Chiba, all of Japan

[73] Assignee: Riken Vitamin Company, Ltd., Tokyo, Japan

[21] Appl. No.: 668,926

[22] Filed: Nov. 6, 1984

[30] Foreign Application Priority Data

Nov. 9, 1983 [JP] Japan .................. 58-210548

[51] Int. Cl.$^4$ .......................... A21D 2/16; A23L 1/16
[52] U.S. Cl. ................................ 426/653; 426/654; 426/19; 426/549
[58] Field of Search .................. 426/653, 654, 549, 19

[56] References Cited

U.S. PATENT DOCUMENTS

| | | | |
|---|---|---|---|
| 4,178,393 | 12/1979 | Gregersen ........................... | 426/653 |
| 4,229,480 | 10/1980 | Suggs et al. ..................... | 426/549 X |
| 4,229,488 | 10/1980 | Suggs et al. ..................... | 426/653 X |
| 4,315,041 | 2/1982 | Fukuda et al. ................... | 426/654 X |
| 4,363,826 | 12/1982 | Fukuda et al. ................... | 426/654 X |
| 4,483,880 | 11/1984 | Koizumi et al. ................. | 426/654 X |

FOREIGN PATENT DOCUMENTS

| | | |
|---|---|---|
| 26900 | 11/1969 | Japan . |
| 14650 | 5/1975 | Japan . |
| 34613 | 11/1975 | Japan . |
| 139739 | 11/1977 | Japan . |
| 73534 | 6/1981 | Japan . |
| 14185 | 3/1983 | Japan . |
| 23058 | 5/1983 | Japan . |
| 47141 | 10/1983 | Japan . |
| 9149 | 2/1984 | Japan . |

OTHER PUBLICATIONS

Kuhrt et al., "Conjoined Crystals. I. Composition & Physical Properties", Journal of the American Oil Chemists' Society (1963), 40, pp. 725–730.

Maruyama et al., "Studies on Polymorphism of Monoglycerides. VIII.", Yukagaku 91979 28, (1979), No. 1, pp. 100–105.

*Primary Examiner*—Robert Yoncoskie
*Attorney, Agent, or Firm*—Armstrong, Nikaido, Marmelstein & Kubovcik

[57] ABSTRACT

An emulsifier composition for use in starch-containing foods which is prepared by powdering by spray cooling at a temperature below 5° C. a mixed melt comprising a saturated fatty acid monoglyceride, and a cis-type unsaturated a fatty acid monoglyceride and/or fatty acid ester of a polyol.

8 Claims, 8 Drawing Figures

NOVEL EMULSIFIER COMPOSITION AND QUALITY IMPROVEMENT METHOD FOR STARCH-CONTAINING FOODS

DETAILED DESCRIPTION OF THE INVENTION

This invention relates to a novel emulsifier composition having excellent improvement effects for starch-containing foods.

Due to their function and safety, mono- and diglycerides are most widely used as an emulsifier in the present food processing industry. The peformance of the emulsifier differs depending on the purity, appearance, physical and chemical properties, and the types of fatty acid component of the emulsifier.

In the case of starch-containing foods, such emulsifiers are required to react well, particularly with starch, to form a complex with the starch. Monoglycerides having a saturated fatty acid moiety of 14 to 18 carbon atoms are known to be excellent in the complex-forming ability with starch.

The methods for the addition of monoglyceride to foods are divided into two groups, that is, one where the emulsifier is used in the oil phase and the other where it is used in the aqueous phase.

In the case of using monoglyceride in the oil phase, there is no particular restriction on the physical properties of monoglyceride, if it is used after being dissolved into oil. However, if the monoglyceride is used in the state of crystal formed in oil by cooling, the shape and the size of the crystalline form can affect the property of the resulting shortening. In general, the crystalline form of a saturated fatty acid monoglyceride in oil is preferably that of fine needle crystals. Special techniques are necessary for the preparative method of crystals, such as cooling, aging, etc. of the mixing system in order to obtain such crystalline form.

In the case of using monoglyceride in the aqueous phase or by blending with raw material in powdered form, the physical appearance, physical and chemical properties of the monoglyceride such as its crystalline form and, the surface condition have a significant bearing on its performance.

Monoglycerides are known to be polymorphic and are classified according to sub-$\alpha,\alpha,\beta'$ and $\beta$ crystalline forms which are arranged in order of increasing melting point. The result of the evaluation indicates that their property improves in the afore-mentioned order. The $\beta$-crystalline form is the most stable thermodynamically and saturated fatty acid monoglycerides have always been marketed in the $\beta$-crystalline form.

The reason why the $\alpha$-crystalline form is more effective in the aqueous phase can be assumed to be because of a difference in hydrophilicity. As a means of obtaining the $\alpha$-crystalline form, there is a conjoined crystal method employing the combined use of saturated fatty acid monoglyceride and saturated fatty acid propyleneglycol ester (J. Am. Oil Chemists Soc. 40, 725(1963)), or a method wherein a monoglyceride dispersion is prepared in warm water, or the like. However each of these methods has disadvantages, such as a small yield of monoglyceride, difficulty in temperature control or in preservation properties.

From these standpoints, it has long been desired to obtain a monoglyceride having the stable $\beta$-crystalline form and which, at the same time, exhibits good performance properties.

In starch-containing foods, if the improvement effects of the monoglyceride are expected on the formation of complex with starch, the use of it in the aqueous phase is more effective. Therefore, methods using monoglyceride in the aqueous phase have principally been investigated hitherto.

Various methods have been investigated to improve hydrophilic properties by increasing the surface area of crystals. As such a means, there is a method whereby a fine crystalline powder of monoglyceride is obtained by recrystallization using a polar solvent (Japan Patent Publication No. 34613/1975), and a method whereby an aqueous dispersion of the $\beta$-crystalline form is obtained by adding a stabilizer into an aqueous dispersion of monoglyceride or a method whereby a dry powdered monoglyceride is obtained by adding hydrophilic binders into an aqueous dispersion of monoglyceride (Japan Patent Publication No. 26900/1969), or the like.

Although each of these methods has excellent improvement effects, however, with respect to obtaining powdered monoglyderide, the methods are disadvantageous because they tend to be expensive from the standpoint of production efficiency, and because a product in paste form is inferior in handling, preservation and stability. Therefore, the development of a more simplified process has long been desired for obtaining a powdered monoglyceride which is effective in the aqueous phase.

As a result of intensive research work in consideration of these shortcomings, the inventors have discovered a novel emulsifier composition which provides excellent quality improvement effects on starch-containing foods and which is easier to handle, less expensive, withstands longer storage and is stable.

The present invention provides a novel emulsifier composition prepared from a monoglyceride composition comprising 60–95 wt% of a saturated fatty acid monoglyceride and 40–5 wt% of a cis-type unsaturated fatty acid monoglyceride and/or fatty acid ester of a polyol which is liquid at ordinary temperature (15°–25° C.), by powdering or granulating under atmospheric pressure conditions at a temperature below 5° C. whereby the temperature of the resultant powdered product is below 10° C.

When a fatty acid monoglyceride is solidified by cooling, it converts to the stable $\beta$-crystalline form via the respective crystalline forms of sub-$\alpha$ or $\alpha$ and $\beta'$. But the products obtained as powder or granule by cooling according to the conventional methods have coarse crystals, so that they cannot exert sufficient improvement effects when added to starch-containing foods.

The most effective method to obtain fine crystals meeting the purpose of the invention is to use a solvent. The method using water or alcohol had already been proposed and practiced partly at present.

However, as described above, problems exist in handling, storage stability and cost.

As a result of extensive investigation, from these standpoints, on the solvent suitable for food, the inventors have found that the monoglyceride having unsaturated fatty acid, with one or more double bonds, wherein at least one of the double bond positions is orientated to cis-type, and/or a fatty acid ester of a polyol which is liquid at room temperature regardless of the types of constitutional fatty acids, are suitable for the purpose of this invention.

A monoglyceride has different polymorphic melting points depending on the types of its constitutional fatty acid. But, when the difference in number of carbon atoms of saturated fatty acid moiety is within 4, the saturated fatty acid monoglyceride form a solid solution. Therefore, saturated fatty acid monoglyceride can be handled behaviorally as one fatty acid monoglyceride. (Yukagaku, 28, No. 1, 100 (1979)).

On the other hand, from the studies employing differential scanning calorimeter, X-ray diffractometer, etc., the inventors have found that a saturated fatty acid monoglyceride does not form a solid solution with most fatty acid esters of a polyol except such specific esters as all trans-type unsaturated fatty acid monoglyceride, saturated fatty acid diglyceride, all trans-type unsaturated fatty acid diglyceride, acetylated saturated fatty acid monoglyceride, lactylated saturated fatty acid monoglyceride, succinylated saturated fatty acid monoglyceride and saturated fatty acid monoester of propyleneglycol, at least if the crystalline form of saturated fatty acid monoglyceride is $\beta'$ or $\beta$. If a saturated fatty acid monoglyceride is mixed and melted with a cis-type unsaturated fatty acid monoglyceride and/or a fatty acid ester of a polyol which is liquid at room temperature, which do not form a solid solution with said monoglyceride, and the resultant mixture is powdered or granulated by spraying with cooling under atmospheric pressure conditions at a temperature of below 5° C., whereby the temperature of the resultant powdered product is below 10° C., the greater part of the crystals of saturated fatty acid monoglyceride is converted to the stable $\beta'$ or $\beta$ crystalline form at the time of powdering and granulating, leading to the completion of the invention.

All trans-type unsaturated fatty acid monoglycerides form a solid solution with saturated fatty acid monoglyceride and the compatibility with cis-type unsaturated fatty acid monoglyceride is relatively excellent. Therefore, if the ratio of all trans-type unsaturated fatty acid monoglyceride in the unsaturated fatty acid monoglyceride exceeds about 30%, there may be a case where the ternary mixture consisting of saturated fatty acid monoglyceride, all trans-type unsaturated fatty acid monoglyceride and cis-type unsaturated fatty acid monoglyceride forms a solid solution. However, if the ratio of all trans-type unsaturated fatty acid monoglyceride is less than about 30%, the cis-type unsaturated fatty acid monoglyceride comes to exist outside the system of the solid solution. Although a trans-type unsaturated fatty acid monoglyceride is an unsaturated fatty acid monoglyceride from the standpoints of the structure and the melting point, it exhibits a crystal behavior similar to that of a saturated fatty acid monoglyceride and the behavior to a fatty acid ester of a polyol except a cis-type unsaturated fatty acid monoglyceride is considered to be same as that of a saturated fatty acid monoglyceride. Therefore, in the invention, trans-type unsaturated fatty acid monoglyceride is limited at a mixing ratio of about 30% for cis-type unsaturated fatty acid monoglyceride, and the same treatment is to be given as saturated fatty acid monoglyceride for the other mixing systems.

In the case of cooling and solidifying the mixed melt of saturated fatty acid monoglyceride and fatty acid ester of a polyol which does not form a solid solution with said monoglyceride by the methods and under the conditions used hitherto, if the ratio of saturated fatty acid monoglyceride in the mixture is low, the saturated fatty acid monoglyceride crystallizes in a discontinuous form in the fatty acid ester of a polyol, and the physical properties and the function of the mixed melt are governed to a great extent by the physical properties and the function of the fatty acid ester of a polyol which forms a continuous phase. While, if the ratio of saturated fatty acid monoglyceride is high, the fatty acid ester of a polyol which does not form a solid solution with the saturated fatty acid monoglyceride is fixed in the saturated fatty acid monoglyceride.

At a time immediately after cooling and solidifying of the mixed melt of a saturated fatty acid monoglyceride and a fatty acid ester of a polyol which does not form a solid solution with said monoglyceride, the greater part of the crystals of saturated fatty acid monoglyceride has sub-$\alpha$ or $\alpha$ form and the crystalline form is converted to the stable $\beta$-form upon standing without further treatment. However, the effects as expected are not exerted since the crystals formed are coarse and inferior in dispersibility into water or oil.

For the accomplishment of the purpose of the invention, how rapidly the crystalline form of the saturated fatty acid monoglyceride is made to convert to the stable $\beta$-form in order to prevent the coarsening of the crystals becomes essential, and further, how well the saturated fatty acid monoglyceride is made to dissolve, disperse or suspend into water or oil at room temperature becomes a problem.

The inventors studied the preparative method for such composition of saturated fatty acid monoglyceride, and had already proposed for the mixed melt of a saturated fatty acid monoglyceride and cis-type unsaturated fatty acid monoglyceride; (1) a treating method at a temperature of above 45° C. after granulating and powdering (Japan unexamined Patent Publication No. 73534/1981) and (2) a method to add more than one of alcohols, organic acids, lecithin and stearyl lactylates in amount of less than 5% to said composition (Japan Patent Publication No. 47141/1983), and for the improvement in the quality of powder, (3) a method to blend oil and fat having a melting point of higher than 45° C. (Japan Patent Publication No. 14185/1983, 23058/1983) and (4) a method to add more than one of tartaric acid monoglycerides and citric acid monoglycerides in amount of less than 10% to said composition (Japan Patent Publication No. 9149/1984).

Though effective are these methods, they have a limit in the processing or they are somewhat insufficient in performance.

As a result of intensive investigation, from these standpoints, of a method which is more economical and more effective, the inventors have found, as described earlier, that by spray granulating and powdering a mixed melt comprising 60–95 wt% of a saturated fatty acid monoglyceride and 40–5 wt% of a cis-type unsaturated fatty acid monoglyceride and/or a fatty acid ester of a polyol which is liquid at room temperature, under atmospheric pressure conditions at a temperature of below 5° C. whereby the temperature is the resultant powdered product of below 10° C., the greater part of crystals of saturated fatty acid monoglyceride has already been converted to the stable $\beta'$- or $\beta$-crystalline form on powdering and granulating, and the crystals are fine enough and easily dispersed into water or oil or at room temperature to give an excellent performance.

If such a method is used since the greater part of the crystals of the saturated fatty acid monoglyceride has already been converted to the stable crystalline form, the size of the crystals does not change upon storage afterwards and the emulsifier composition retains its performance for a long period.

It is well-known that when crystalline substances are recrystallized after being dissolved in a solvent, the size of the crystals grow large if the cooling velocity is slow, and the faster the cooling velocity, the smaller the size of the crystals. This phenomenon can also be observed in the case of a saturated fatty acid monoglyceride. A fatty acid ester of a polyol which does not form a solid solution with a saturated fatty acid monoglyceride acts as a recrystallization solvent and it should preferably have a lower solidifying point than the crystallizing temperature of the saturated fatty acid monoglyceride in order to accomplish the purpose of rapid cooling efficiently. If the solidifying temperature of the fatty acid ester of a polyol is high, the minuteness of the crystals of said saturated fatty acid monoglyceride is inhibited, even if the solid solution would not be formed, because of the formation of eutectics crystal with the saturated fatty acid monoglyceride upon cooling.

However, if the mixed melt of low melting fatty acid ester of a polyol and saturated fatty acid monoglyceride is subjected merely to rapid cooling under normal conditions, the saturated fatty acid monoglyceride crystallizes in a crystalline form mainly composed of the unstable sub-$\alpha$ or $\alpha$ form and substantial coarsening of the crystals is caused upon conversion to the stable form. Therefore, the purpose of the invention cannot be achieved.

As a result of intensive study with regard to these points, the inventors have found that spray cooling is the most suitable method to promote the transition of the crystalline form.

Namely, when the mixed melt of saturated fatty acid monoglyceride and low melting point fatty acid ester of a polyol which does not form a solid solution with said the saturated fatty acid monoglyceride is cooled in a form of block or sheet, saturated fatty acid monoglyceride crystallizes in the crystalline form of sub-$\alpha$ or $\alpha$ and the ratio of sub-$\alpha$ form increases as the crystallizing temperature is lowered. Also, it is well-known that the conversion velocity of the crystalline form is delayed generally as the surrounding temperature is lowered. In spite of these facts, the inventors have found that in the case of spray cooling, crystals in the sub-$\alpha$ crystalline form are not observed even at room temperature, the main part is composed of $\alpha$ form, and the transition to the stable $\beta'$- or $\beta$-form is promoted as the surrounding temperature during spraying or the temperature of the powdered product become low.

This phenomenon of the transition to the stable $\beta'$- or $\beta$-form caused simultaneously with spray cooling is presumed to be due to a so-called mechanochemical phenomenon. In more detail, this is considered to be due to the fact that, through the formation of fine particles and the enlargement of surface area accompanied with spray cooling, the contractibility of the crystals is also promoted together with an increase in the cooling velocity, and a sort of dislocation phenomenon is increased because of the small cooling contractibility ratio of the fatty acid ester of a polyol as a solvent against the large cooling contractibility ratio of the saturated fatty acid monoglyceride in the mix-melted system. If the size of the particles become remarkable, it is considered that the internal resistance against the contractibility is increased as well as the cooling velocity becomes slow due to a decrease in the surface area and an increase in the volume, resulting in the suppression of the mechanochemical phenomenon. Thereby, the significance of spray cooling which brings an increase in the surface area and a decrease in the volume instantaneously can be explained. Although such mechanochemical phenomenon is known in the cases of the mechanical grinding of inorganic substances, the rapid cooling of mixed melt of metals, etc., there have been no reports hitherto in the field relating to oils and fats and the present invention is the first.

As described above, the mechanochemical phenomenon is caused independently of the conditions of spraying, if the spray cooling is used. However, the degree of the transition of crystals differs depending on the spraying conditions, that is, the surrounding temperature during spraying or the temperature of the powdered product, and the degree of the transition of crystalline form is increased with lowering in the surrounding temperature and the temperature of the powdered product. Although it is not always easy to analyze the exact degree of the transition of crystalline form quantitatively, it is concluded on the basis of empirical evaluation that the conditions necessary to accomplish the purpose of a invention are the surrounding temperature of less than about 5° C. and a temperature of the resultant powdered product of less than about 10° C., more preferably, a surrounding temperature of less than about 0° C. and a temperature of the powdered product of less than about 5° C.

Under the conditions wherein the surrounding temperature is more than about 5° C. and the temperature of the resultant powdered product is more than about 10° C., the ratio of unstable $\alpha$-crystalline form is increased in the crystals of saturated fatty acid monoglyceride, and auxiliary means such as tempering etc. become necessary. In this sense, the flow of cooling wind to the flow of spray droplets produced in the spray cooling apparatus is preferably parallel current rather than countercurrent.

Moreover, in the development of the mechanochemical phenomenon as described above, the effect of the particle size of the product cannot be denied and the finer size is better. However, as far as the invention is concerned, a particle diameter of less than approximately 350 microns is sufficient, so that a special technique for the spray cooling is not necessary.

In order to convert the crystals of saturated fatty acid monoglyceride to the stable $\beta'$- or $\beta$-crystalline form through the mechanochemical phenomenon at the time of spray cooling in the invention, it is necessary that a solute, which melts homogeneously into the saturated fatty acid monoglyceride during the melting of said saturated fatty acid monoglyceride, does not form a solid solution during cooling and solidifying at least when the crystals of said saturated fatty acid monoglyceride are in the crystalline form of $\beta'$- or $\beta$- and has a solidifying point less than the melting point of sub-$\alpha$ crystals of saturated fatty acid monoglyceride, is made to coexist in a mixed and melted form with the saturated fatty acid monoglyceride.

Moreover, since dispersion and suspension into water or oil at room temperature are the objectives, the fatty acid ester of a polyol must also be active at room temperature.

As edible substances having these physical properties, there are cis-type unsaturated fatty acid monoglycerides having an unsaturated fatty acid with one or more double bonds in their molecule as a constitutional fatty acid (such as palmitooleic acid, oleic acid, linoleic acid, linolenic acid, erucic acid, cis-9-trans-12-octadecadienoic acid or the like), wherein at least one of the double bond positions is arranged in cis-form, and fatty acid esters of a polyol which are substantially liquid at room temperature regardless of the types of their constitutional fatty acids.

Since the $\beta$-crystalline form of a cis-type unsaturated fatty acid monoglyceride is active in point of hydration to water particularly at room temperature, though the melting point thereof is sometimes higher than room temperature, and the melting points of sub-$\alpha$ and -$\alpha$ crystals are low, it is particularly effective for use in the aqueous phase. There are many fatty acid esters of a polyol which are liquid at room temperature. Several examples are propyleneglycol mono- or dioleate, linoleic acid diglyceride, acetic acid diester of stearic acid monoglyceride, citric acid ester of oleic acid monoglyceride, linoleic acid triglyceride, natural oils and fats such as soybean oil, corn oil, etc., sorbitan monolaurate, sorbitan trioleate, polyoxyethylenesorbitan monostearate, polyglycerol dioleate, sucrose monoleate and so on. But fatty acid esters of polyol are not necessarily restricted to these examples and can be used as long as they are liquid at room temperature. Also, those fatty acid esters of polyols which do not form a solid solution with a saturated fatty acid monoglyceride, are mix-melted into a cis-type unsaturated a fatty acid monoglyceride and/or fatty acid ester of a polyol which is liquid at room temperature, and do not inhibit the physical properties of the individual ester can be incorporated without any difficulties, even if they would be solid at room temperature.

Moreover, high melting point waxes and esters which do not form a solid solution with saturated fatty acid monoglyceride and are insoluble below room temperature in cis-type unsaturated fatty acid monoglyceride and/or a fatty acid ester of a polyol which is liquid at room temperature, for example, castor wax, glycerol tristearate, sorbitan tristearate, triglycerol pentastearate, etc., can also be used within a limited amount not inhibiting the function of the saturated fatty acid monoglyceride.

In addition, it is possible for low melting point alcohols and paraffins such as propyleneglycol, glycerol, liquid paraffin, etc. to be used for the purpose of the improvement in the physical properties of the cis-type unsaturated fatty acid monoglyceride and/or fatty acid ester of a polyol which is liquid at room temperature.

In fatty acid monoglyceride compositions of the above composition and obtained by the above manufacturing method, the crystals of saturated fatty acid monoglyceride are already fine and the crystalline form has also been converted to the stable $\beta'$- or $\beta$-form during spray cooling, powdering and granulating. Therefore, the crystals hardly grow further and the cis-type unsaturated fatty acid monoglyceride and/or fatty acid ester of a polyol which is liquid at room temperature used in the composition are present between the gaps of the crystals of saturated fatty acid monoglyceride thereby enclosing said crystals in a thin filmy state.

In application of the products thus obtained, if the dispersion solute is water, a strong hydrophilic ester such as a cis-type unsaturated fatty acid monoglyceride, polyoxyethylenesorbitan monooleate, diacetyl tartaric acid ester of oleic acid monoglyceride, etc. may be used according to the purpose of the application and, if the dispersion solute is oil, any ester may be used arbitrarily according to the purpose of the application. Moreover, if need be, the cis-type unsaturated fatty acid monoglyceride and/or fatty acid ester of a polyol which is liquid at room temperature used in the composition act as disintegrating agents, and the crystals of saturated fatty acid monoglyceride can easily be dispersed into the aqueous solution or oil in a fine state which functions effectively.

On the other hand, with regard to the spray powdering and granulating under low temperature, a method for a spray powdering and granulation after the preparation of crystal formation of oil and fat is presented in Japan Patent Publication No. 14650/1975. However, this is essentially of a different skill in that the present invention uses saturated fatty acid monoglyceride as main crystals and the spray cooling is directly carried out without the crystal formation of mixed melt. Also, in Japan Unexamined Patent Publication No. 139739/1977, a method for promoting the transition of the crystalline form of saturated fatty acid monoglyceride after it is manufactured, the spray powdering and granulating of a mixed melt of saturated $C_{12}$-$C_{14}$ fatty acid monoglyceride and phosphatide is presented. However, this is originally of a different skill in that, in the present invention, the simultaneous crystal transition with the spray cooling is carried out through the existence of a cis-type unsaturated fatty acid monoglyceride and/or fatty acid ester of a polyol which is liquid at room temperature. Further, although similar compositions are presented in U.S. Pat. Nos. 4,229,480 and 4,229,488, these are also essentially of different skills in that the substances in the present invention are not allowed to form a solid solution in contrast to the composition in said patents being in solid solutions.

According to the method of this invention, the mechanochemical phenomenon becomes more effective in a system wherein the cis-type unsaturated fatty acid monoglyceride and/or fatty acid ester of a polyol which is liquid at room temperature are used in large amounts. If the content of saturated fatty acid monoglyceride is lowered to less than 60%, the fluidity of the powder becomes inferior and the function of saturated fatty acid monoglyceride is diluted, so that the original purpose cannot be accomplished. Also, if the content of saturated fatty acid monoglyceride is more than 95%, probably as a result of cis-type unsaturated fatty acid monoglyceride and/or fatty acid ester of a polyol being taken into the crystal structure of saturated fatty acid monoglyceride, the mechanochemical phenomenon becomes difficult to obtain and the method of the invention cannot be applied.

It is known from the results of measurement by X-ray diffraction, differential thermal analysis, etc. that the major part of the crystalline form of the saturated fatty acid monoglyceride in the emulsifier composition obtained according to the invention is $\beta$-crystal and the minor part is $\beta$-crystal. Therefore, it is understood, as described above, that its function and stability are excellent.

The emulsifier composition in the invention can be used merely by mixing with a powder which is a raw material of food or with water or oil. Troublesome steps such as heating, cooling, etc. for the control of the crystalline form are unnecessary in this invention, thus leading to an extremely excellent production process, even if machine power would be needed for further homogenization.

The emulsifier composition in the invention is used by adding to food or a mix which contains starch directly or in the form of dispersion or suspension in water or oil to improve the quality of starch-containing foods. This composition exerts excellent quality improvement effects in the making of bread, cake, hot cake, noodles, cookies, food made from fish and livestock and the said mixes.

BRIEF DESCRIPTION OF THE DRAWINGS

FIG. 6a: A diagram showing analytical data with DSC on a product obtained from a mixed melt of 70 parts of fully hardened palm oil fatty acid distilled monoglyceride and 30 parts of acetic acid diester of coconut hardened oil fatty acid distilled monoglyceride under the same conditions as indicated in FIG. 5a.

FIG. 6b: A diagram showing analytical data with DSC when the melt of the same composition as above is slowly cooled.

FIG. 7a: A diagram showing analytical data with DSC on a product obtained from a mixed melt of 70 parts of fully hardened palm oil fatty acid distilled monoglyceride and 30 parts of rapeseed oil under the same conditions as indicated in FIG. 5a.

FIG. 7b: A diagram showing analytical data with DSC when the melt of the same composition as above is slowly cooled.

FIG. 8a: A diagram showing analytical data with DSC on a product obtained from a mixed melt of 70 parts of fully hardened palm oil fatty acid distilled monoglyceride and 30 parts of fully hardened beef tallow under the same conditions as indicated in FIG. 5a.

FIG. 8b: A diagram showing analytical data with DSC when the melt of the same composition as above is slowly cooled.

EMBODIMENT OF EXAMPLES

In the following, the invention will be explained by using examples.

EXAMPLE 1

Figure 1:
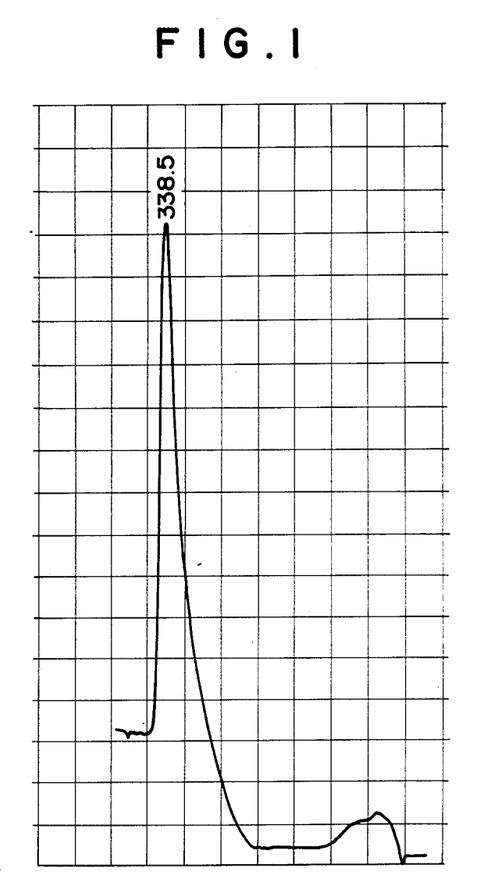
FIG. 1: A diagram showing analytical data with differential scanning calorimeter (hereinafter referred to as DSC) on a powdered product obtained from an equivalent mixed melt of refined palm oil fatty acid distilled monoglyceride and fully hardened palm oil fatty acid distilled monoglyceride under the conditions of surrounding atmospheric temperature of 15° C. and product temperature of 30° C.
Figure 2:
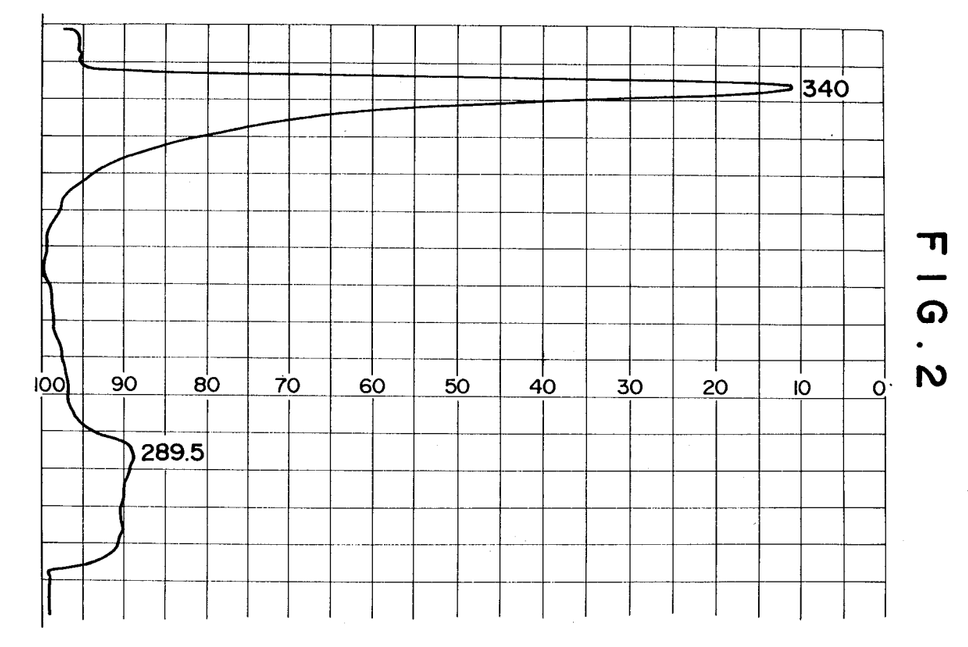
FIG. 2: A diagram showing analytical data with DSC on a product obtained from the same composition as above under the conditions of surrounding atmospheric temperature of 5° C. and product temperature of 10° C.
Figure 3:
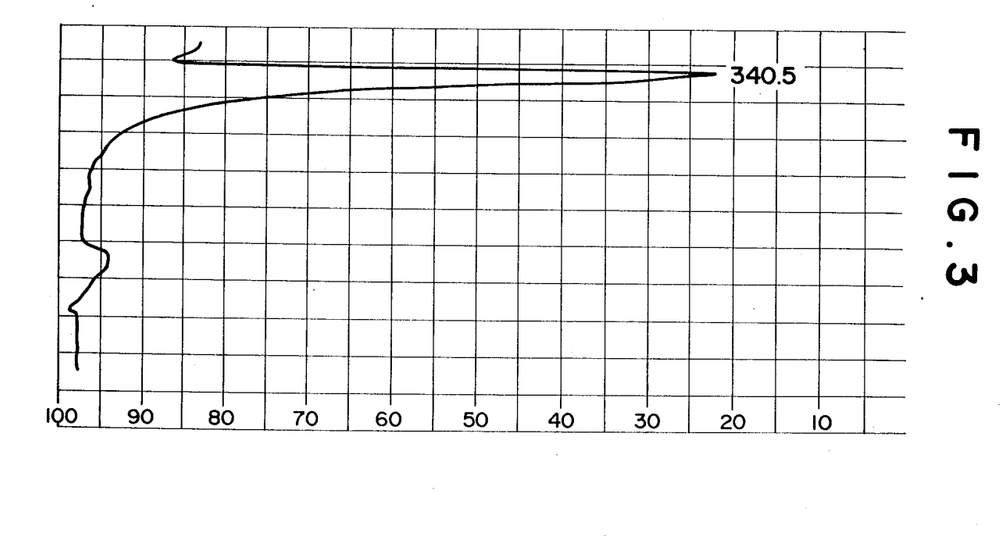
FIG. 3: A diagram showing analytical data with DSC on a product obtained from the same composition as above under the conditions of surrounding atmospheric temperature of $-25°$ C. and product temperature of $-5°$ C.
Figure 4:
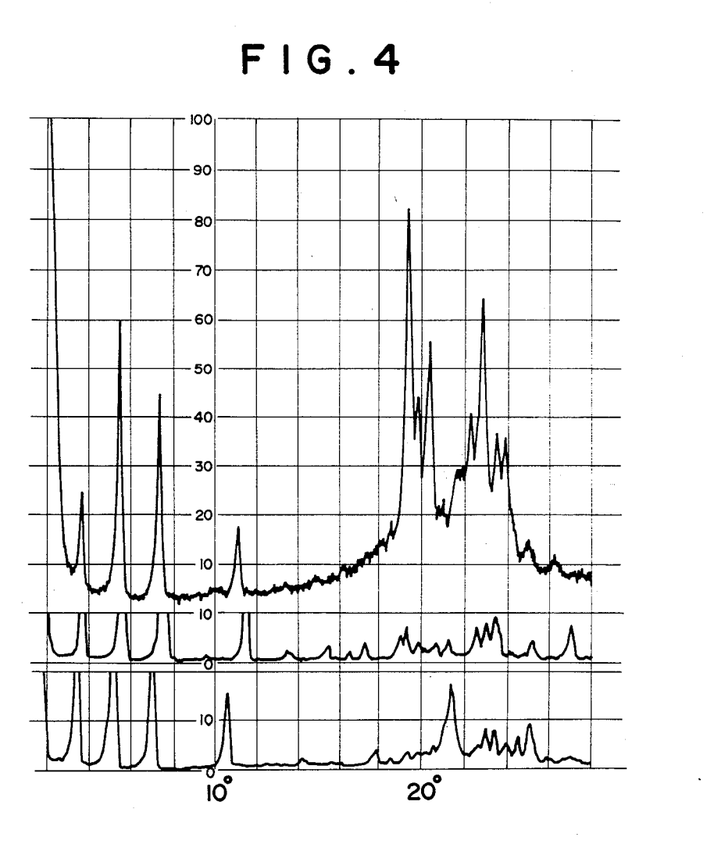
FIG. 4: A diagram of X-ray diffraction on a product obtained under the same conditions as indicated in FIG. 2.
Figure 5:
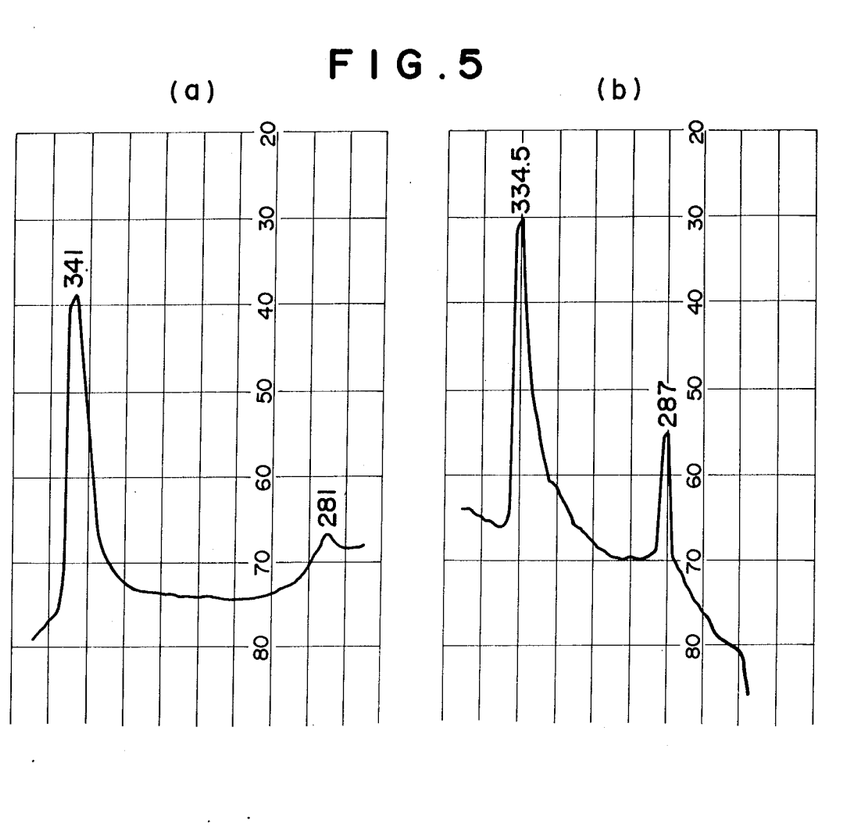
FIG. 5a: A diagram showing analytical data with DSC on a product obtained from a mixed melt of 70 parts of fully hardened palm oil fatty acid distilled monoglyceride and 30 parts of caprylic acid triglyceride under the conditions of surrounding atmospheric temperature of $-25°$ C. and product temperature of $-5°$ C.
FIG. 5b: A diagram showing analytical data with DSC when the melt of the same composition as above is slowly cooled.
Figure 6:
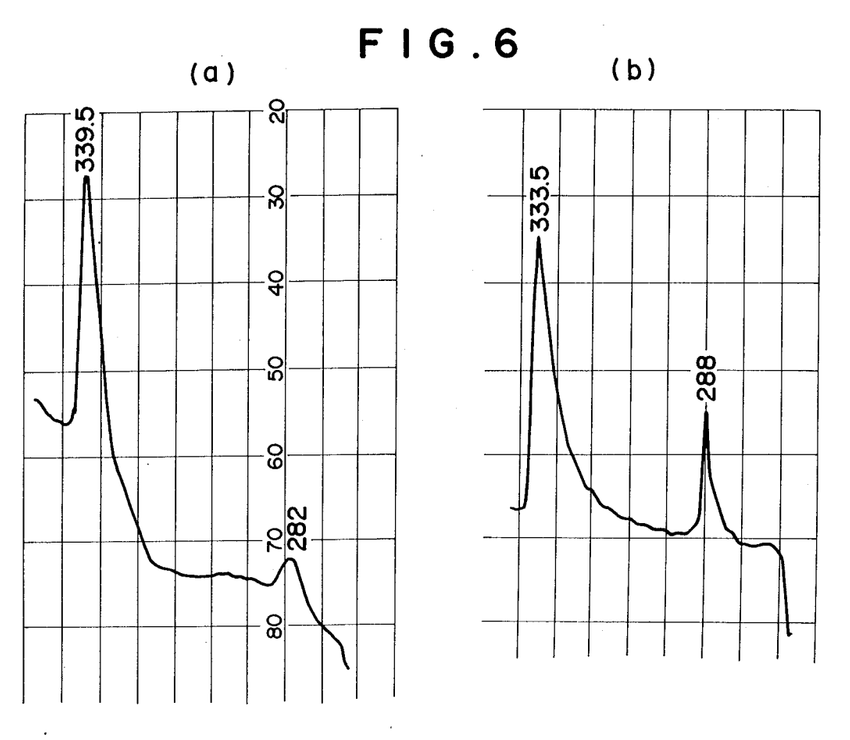
Figure 7:
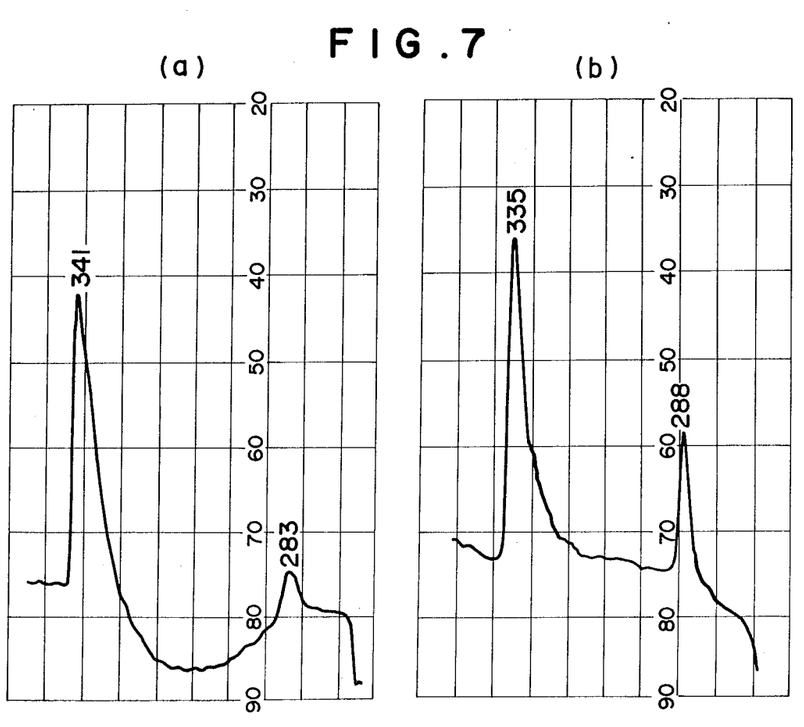
Figure 8:
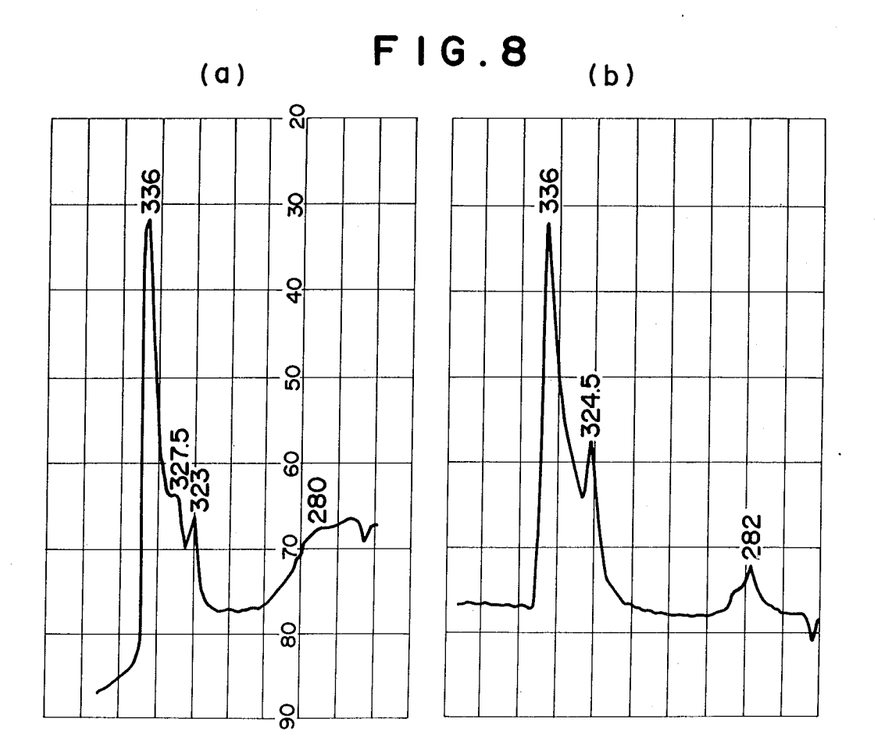

A mixture of equivalent amounts of refined palm oil fatty acid distilled monoglyceride and fully hardened palm oil fatty acid distilled monoglyceride (Content of monoglyceride in monoglyceride composition 97%, Composition of fatty acid; $C_{16}=48\%$, $C_{18}=28\%$, cis-$C_{18'}=17\%$, cis-$C_{18''}=4\%$, Iodine value 20) was melted, spray cooled under surrounding atmospheres of different temperatures and allowed to pass through a sieve mesh of 355 microns to obtain a powder with medium diameter of about 220 microns. Immediately after spraying, differential scanning calorimeter (DSC) analysis and X-ray diffraction were carried out. DSC diagrams of the products obtained under the conditions of surrounding atmospheric temperature of 15° C. (Temperature of product 30° C.), 5° C. (10° C.) and $-25°$ C. ($-5°$ C.) are shown in FIG. 1, FIG. 2 and FIG. 3, respectively, and X-ray diffraction diagram of the product obtained at a surrounding atmospheric temperature of 5° C. (Temperature of product 10° C.) is shown in FIG. 4. It can be observed from the X-ray diffraction diagram that, although the transition of the crystals is insufficient to some extent at a surrounding atmospheric temperature of 15° C., the greater part is converted to the $\beta$-crystalline form at 5° C.

In order to evaluate the function of the products obtained comparatively, Blue-Value (hereinafter abbreviated to as B.V.) using the iodine-starch reaction and the aging retardation effect on bread according to bread making test by sponge-dough method were measured. Results are shown in Table 1, wherein the effectiveness of the spray cooling at low temperature can be recognized.

TABLE 1

| | Spraying conditions and function | | | | | |
|---|---|---|---|---|---|---|
| | Surrounding | | | Aging retardation effect (kg/10 mm) | | |
| Sample No. | temperature on spraying (°C.) | B.V. | Dough test | 1st day | 2nd day | 3rd day |
| 1 | 15 | 0.380 | Δ | 1.16 | 1.52 | 1.69 |
| 2 | 5 | 0.205 | ⊚ | 1.18 | 1.41 | 1.57 |
| 3 | −25 | 0.165 | ⊚ | 1.13 | 1.36 | 1.54 |
| 4 | Blank | 0.650 | X | 1.33 | 1.63 | 2.19 |

Test method by B.V.: Test material of 0.02 g was added to 40 ml of 0.5% starch solution at 32° C. and shaken. After shaking, 1 ml of 0.02N iodine solution was added to 2.5 ml of the above starch solution and the obtained solution was blended well by shaking. Then this solution was diluted with distilled water up to 100 ml. Absorbance was measured by spectrophotometry at a wavelength of 660 nm after filtering. The temperature of the solution was kept at 32° C. when handling.

Bread making test method: By sponge-dough method (AACC method). The added amount of emulsifier composition (as emulsifier) to wheat flour was 0.4%. The dough test was done by sensory inspection. Baked bread was kept at 20° C. and the degree of aging retardation was measured.

Aging retardation test method: Five test specimens of 5 cm square and 1.5 cm in thickness were taken from the central portion of the bread and were measured with Texturometer(plunger 5 cm $\phi$, 10 cm flat dish, clearance 5 mm, low speed, electric voltage 2 V). The lower the value, the more remarkable the retardation effect.

Evaluation of Dough Test

⊚ : very good, dryness and good spreadability
△: poor, slightly sticky and inferior in-spreadability
X: bad, sticky and cannot handle

EXAMPLE 2

A mixed melt of 70 parts of fully hardened palm oil fatty acid distilled monoglyceride (Iodine value=0.7, Content of monoglyceride 97%, Composition of fatty acid; $C_{16}=46\%$, $C_{18}=52\%$, $C_{18'}=1\%$), 30 parts of each of the following respectively: caprylic acid triglyceride (Iodine value=0, Composition of fatty acid; $C_8=98\%$, $C_{10}=2\%$) (Sample No. 5), acetic acid diester of coconut hardened oil fatty acid distilled monoglyceride (Iodine value=0.8, Content of monoglyceride 96%, Composition of fatty acid; $C_8=9\%$, $C_{10}=6\%$, $C_{12}=47\%$, $C_{14}=18\%$, $C_{16}=9\%$, $C_{18}=11\%$) (liquid Sample No. 6), rapeseed oil (Iodine value=103, Composition of fatty acid; $C_{16}=2.5\%$, $C_{18}=1\%$, $C_{20}=0.5\%$, $C_{22}=2\%$, $C_{18'}=22\%$, $C_{20'}=11\%$, $C_{22'}=33\%$, $C_{18''}=18\%$, $C_{20''}=1\%$, $C_{18'''}=9\%$) (Sample No. 7) and fully hardened beef tallow (Iodine value=0.8, Composition of fatty acid; $C_{14}=4\%$, $C_{16}=27\%$ $C_{18}=69\%$) (Sample No. 8) was spray cooled under the conditions of surrounding atmospheric temperature of $=25°$ C. and powdered product temperature of $-5°$ C., and immediately DSC measurement was carried out. Respective DSC diagrams are shown in FIG. 5(a), FIG. 6(a), FIG. 7(a) and FIG. 8(a), and DSC diagrams obtained from the slowly cooled products of respective mixed melts are shown in FIG. 5(b), FIG. 6(b), FIG. 7(b) and FIG. 8(b). With regard to caprylic acid triglyceride, acetic acid diester of coconut hardened oil fatty acid distilled monoglyceride and rapeseed oil, the development of the mechanochemical phenomenon is obvious, whereas, with regard to fully hardened beef tallow, the transition to $\beta$-chrystalline form of fully hardened palm oil fatty acid distilled monoglyceride is observed to be insufficient.

EXAMPLE 3

Mixed melts of distilled monoglyceride composed of 40% fully hardened soybean oil fatty acid and 60% fully hardened palm oil fatty acid (Iodine value=0.8, Content of monoglyceride 97%, Composition of fatty acid; $C_{16}=31\%$, $C_{18}=68\%$, $C_{18'}=1\%$) and various ratios of olive oil fatty acid distilled monoglyceride (Iodine value=67, Content of monoglyceride 97%, Composition of fatty acid; $C_{16}=10\%$, $C_{18}=2\%$, cis-$C_{18'}=82\%$, cis-$C_{18''}=6\%$) were spray cooled under the conditions of surrounding atmospheric temperature of $-40°$ C. and powdered product temperature of $-20°$ C., and immediately DSC measurement was carried out. All samples had two endothermic peaks at high and low temperatures. Results are shown in Table 2.

For a reference, distilled monoglyceride composed of 40% fully hardened soybean oil fatty acid and 60% fully hardened palm oil fatty acid was powdered, and aged for 120 hours at 50° C. The powder showed a endothermic peak temperature of the stable type.

TABLE 2

Mixing ratios of saturated-cis-type unsaturated monoglyceride and DSC endothermic peak temperature (°K.)

| Sample No. | cis-type-unsaturated monoglyceride/Saturated monoglyceride | Iodine value | Peak temperature at low | Peak temperature at high |
|---|---|---|---|---|
| 9 | 0/100 | 0.8 | — | 348 |
| 10 | 5/95 | 3.4 | 285 | 347 |
| 11 | 10/90 | 6.7 | 287 | 346 |
| 12 | 15/85 | 10.0 | 290 | 345 |
| 13 | 20/80 | 13.4 | 290 | 345 |
| 14 | 25/75 | 16.8 | 293 | 344 |
| 15 | 35/65 | 23.5 | 294 | 341 |

All samples are recognized to be of the stable type. The reason why the peak temperature on the high temperature side is lowered as the ratio of cis-unsaturated monoglyceride increases is considered to be a superposed result of the solvent effect of cis-type unsaturated monoglyceride and the fact that a part of cis-type unsaturated monoglyceride is taken into the crystal structure of saturated monoglyceride, and the reversed trend of the peak temperature on the low temperature side is considered due to a probable reason why saturated monoglyceride is dissolved into cis-type unsaturated monoglyceride.

EXAMPLE 4

To fully hardened cotton seed oil fatty acid distilled monoglyceride (Iodine value=0.8, Content of monoglyceride 97%, Composition of fatty acid; $C_{14}=3\%$, $C_{16}=20\%$, $C_{18}=76\%$, $C_{18'}=1\%$) were mix-melted various types of hydrophilic fatty acid esters of polyol. The mixed melts were sprayed under the conditions of surrounding temperature of $-30°$ C. and powered product temperature of about $-15°$ C., and B.V. of the powder obtained was measured. The results are shown in Table 3.

TABLE 3

Formulations of samples and B.V. values

| Sample No. | Fatty acid ester of polyol | Blending ratio (%) | Iodine value | B.V. |
|---|---|---|---|---|
| 16 | Polysorbate 80 (POE* sorbitan mono-oleate) | 40 | 8 | 0.178 |
| 17 | Olive oil fatty acid distilled monoglyceride | 20 | 18 | 0.160 |
|  | Diacetyl tartaric acid ester of olive oil fatty acid distilled monoglyceride | 10 |  |  |
| 18 | Safflower oil fatty acid distilled monoglyceride | 15 | 23 | 0.180 |
|  | Polysorbate 60 (POE* sorbitan monostearate) | 25 |  |  |
| 19 | Oleic acid diester of decaglycerol | 40 | 15 | 0.205 |
| 20 | Safflower oil fatty acid distilled monoglyceride | 40 | 47 | 0.235 |
| 21 | Blank | 0 | — | 0.650 |

*POE: polyoxyethylene

EXAMPLE 5

Employing Sample No. 9, No. 14 and No. 15 in Example 3 and Sample No. 16, No. 17, No. 18, No. 19 and No. 20 in Example 4, bread making test was carried out according to Example 1.

Results are shown in Table 4.

TABLE 4

| Sample No. | Results of bread making test | | | |
|---|---|---|---|---|
| | Dough test | Aging retardation effect | | |
| | | 1st day | 2nd day | 3rd day |
| 9 | Example 3 | X | 1.33 | 1.65 | 2.21 |
| 14 | " | ⊚ | 1.15 | 1.34 | 1.58 |
| 15 | " | ⊚ | 1.08 | 1.34 | 1.62 |
| 16 | Example 4 | ⊚ | 1.21 | 1.41 | 1.73 |
| 17 | " | ⊚ | 1.11 | 1.33 | 1.57 |
| 18 | " | ⊚ | 1.13 | 1.38 | 1.63 |
| 19 | " | ⊚ | 1.17 | 1.41 | 1.65 |
| 20 | " | ⊚ | 1.08 | 1.28 | 1.58 |
| Blank | | X | 1.50 | 1.98 | 2.32 |

EXAMPLE 6

Employing Sample No. 7 in Example 2 and Sample No. 9 and No. 10 in Example 3, fluid shortening was prepared to evaluate the cake-making properties. The formulation for preparing fluid shortening is as follows:

| | |
|---|---|
| Saturated fatty acid monoglyceride | 10% |
| Stearic acid monoester of propyleneglycol | 10% |
| Rice bran oil | 80% |
| Esters other than saturated fatty acid monoglyceride in sample | |

With regard to the preparation of fluid shortening, to a mixed liquid of stearic acid monoester of propyleneglycol dissolved by heat into rice bran oil was dispersed another sample at 40° C, under stirring with TK Homomixer (made at Tokushu Kika Industries) and the dispersion was cooled to room temperature.

The formulation for making cake is indicated below.

| Ingredient | Parts by weight |
|---|---|
| Wheat flour | 100 |
| Sugar | 100 |
| Whole egg | 100 |
| Baking powder | 1 |
| Fluid shortening | 30 |
| Water | 40 |

Results of the evaluation of cake are shown in Table 5.

TABLE 5

| Sample No. | Results of evaluation of cake | | |
|---|---|---|---|
| | Specific gravity of dough (g/ml) | Inner phase of cake | Specific volume of cake (ml/g) |
| 7 | 0.48 | Good | 4.3 |
| 9 | 0.55 | Hard portion Color unevenness | 3.6 |
| 10 | 0.45 | Good | 4.5 |
| Blank* | 1.08 | Hard portion Color unevenness | 2.8 |

*Rice bran oil was used for all of fluid shortening part.

Sample No. 7 and No. 10 are recognized to be effective.

What is claimed is:

1. A powdered emulsifier composition prepared by melt mixing 60–95% by weight of a saturated fatty acid monoglyceride and 40–5% by weight of a cis-type unsaturated fatty acid monoglyceride, converting the resultant mixture to a powder to spray cooling under atmospheric pressure conditions at a temperature of below 5° C., whereby the temperature of the resultant powdered produce is below 10° C. and wherein said powder product contains a major amount of the saturated fatty acid monoglyceride in a β-crystalline form.

2. A powdered emulsifier composition prepared by melt mixing 60–95% by weight of a saturated fatty acid monoglyceride and 40–5% by weight of a cis-type unsaturated fatty acid monoglyceride, converting the resultant mixture to a powder under atmospheric pressure conditions at a temperature of below 0° C., whereby the temperature of the resultant powdered product is below 5° C. and wherein said powder product contains a major amount of the saturated fatty acid monoglyceride in a β-crystalline form.

3. A powder emulsifier composition prepared by melt mixing 60–95% by weight of a saturated fatty acid monoglyceride and 40–5% by weight of a fatty acid ester of a polyol, said fatty acid ester being liquid at room temperature, converting the resultant mixture to a powder under atmospheric pressure conditions at a temperature of below 5° C., whereby the temperature of the resultant powdered product is below 10° C. and wherein said powder product contains a major amount of the saturated fatty acid monoglyceride in a β-crystalline form.

4. A powder emulsifier composition prepared by melt mixing 60–95% by weight of a saturated fatty acid monoglyceride and 40–5% by weight of a fatty acid ester of a polyol, said fatty acid ester being liquid at room temperature, converting the resultant mixture to a powder under atmospheric pressure conditions at a temperature of below 0° C., whereby the temperature of the resultant powdered product is below 5° C. and wherein said powder product contains a major amount of the saturated fatty acid monoglyceride in a β-crystalline form.

5. A powder emulsifier composition prepared by melt mixing 60–95% by weight of a saturated fatty acid monoglyceride and 40–5% by weight of a mixture of a cis-type unsaturated fatty acid monoglyceride and a fatty acid ester of a polyol, such fatty acid ester being liquid at room temperature, converting the resultant mixture to a powder under atmospheric pressure conditions at a temperature of below 5° C., whereby the temperature of the resultant powdered product is below 10° C. and wherein said powder product contains a major amount of the saturated fatty acid monoglyceride in a β-crystalline form.

6. A powder emulsifier composition prepared by melt mixing 60–95% by weight of a saturated fatty acid and 40–5% by weight of a mixture of a cis-type unsaturated fatty acid monoglyceride and a fatty acid ester of a polyol, such fatty acid ester being liquid at room temperature, converting the resultant mixture to a powder under atmospheric pressure conditions at a temperature of below 0° C., whereby the temperature of the resultant powdered product is below 5° C. and wherein said powder product contains a major amount of the saturated fatty acid monoglyceride in a β-crystalline form.

7. The emulsifier composition according to any one of claims 3–6, wherein the fatty acid ester of a polyol is selected from the group consisting of propyleneglycol mono- or di-unsaturated fatty acid ester, unsaturated fatty acid diglyceride, acetic acid diester of saturated or unsaturated fatty acid monoglyceride, citric acid ester of unsaturated fatty acid monoglyceride, diacetyl tartaric acid ester of unsaturated fatty acid monoglyceride, saturated or unsaturated fatty acid ester of sorbitan, polyoxyethylene sorbitan saturated or unsaturated fatty acid ester, polyglycerol mono- or di-saturated or unsaturated fatty acid ester, sucrose unsaturated fatty acid ester, $C_{8-12}$ saturated fatty acid triglyceride, unsaturated fatty acid triglyceride, and natural oil.

8. A method of improving the quality of starch-containing food which comprises adding to said food or to a preparative component thereof an effective amount of the emulsifier composition recited in any of claims 1-6.

* * * * *